United States Patent Office 3,138,328
Patented June 23, 1964

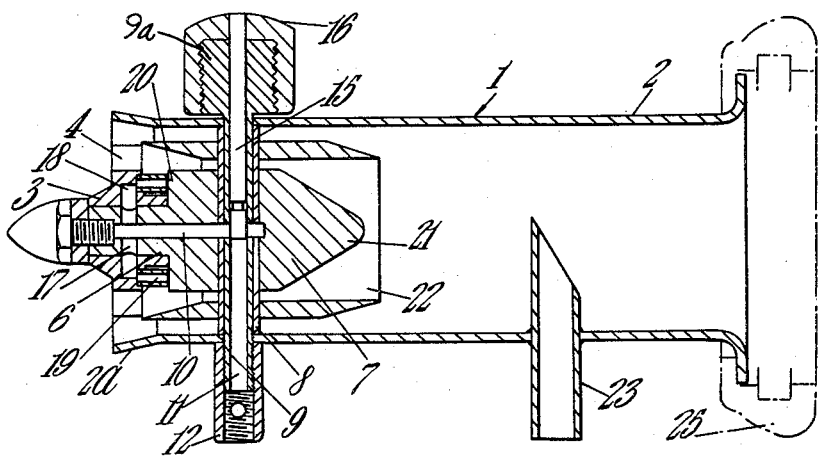
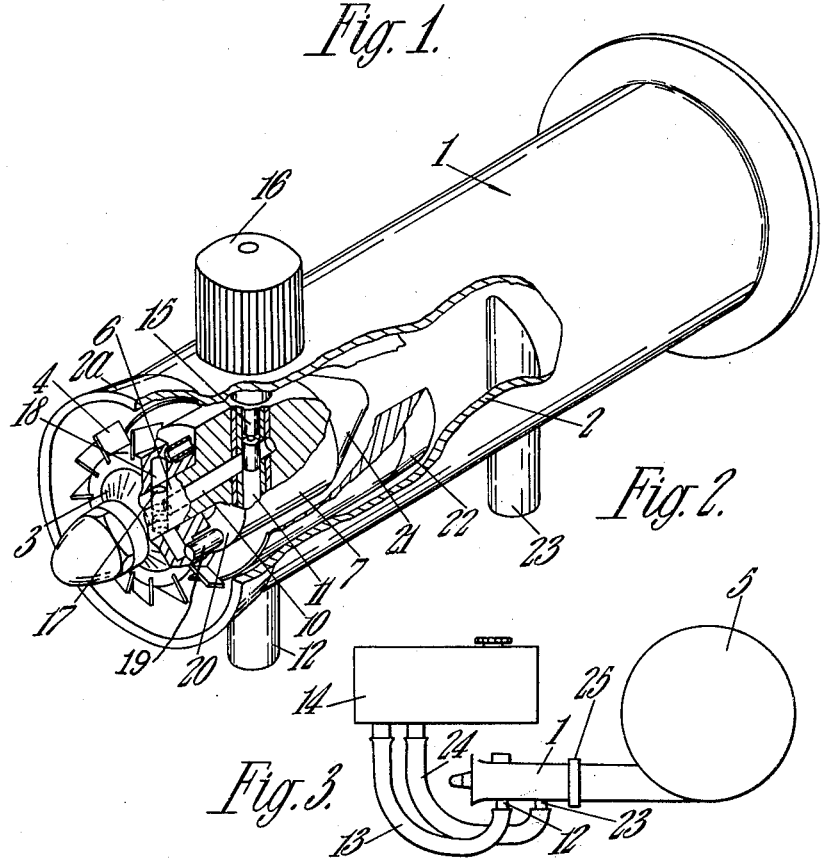

3,138,328
APPARATUS FOR GENERATING AEROSOLS
Alan Geoffrey Scruton Glasby, Oxted, England, assignor to Alan Glasby and Company Limited, Croydon, Surrey, England
Filed July 2, 1962, Ser. No. 206,965
Claims priority, application Great Britain July 7, 1961
2 Claims. (Cl. 239—77)

This invention relates to atomisers or apparatus for generating aerosols, that is to say colloidal suspensions of fine particles of liquid dispersed in a gas, and more particularly to a nozzle or atomiser head for use in such apparatus.

It is an object of the present invention to provide an improved nozzle or atomiser head, which may be designed to provide any desired output and any desired particle size over relatively wide ranges.

The present invention consists in a nozzle for apparatus for generating an aerosol, wherein means are provided for supplying a liquid to at least one supply orifice which opens into a gas, the or each orifice being moved at a speed sufficient to create a colloidal suspension of the liquid in the gas as the liquid emerges from the orifice.

The invention further consists in a nozzle as set forth in the preceding paragraph, wherein the or each orifice is arranged to be moved in the plane of the orifice.

The invention still further consists in apparatus for generating an aerosol, which includes a nozzle as set forth in either of the two preceding paragraphs.

In the accompanying drawings:

FIGURE 1 is a longitudinal section taken through a nozzle according to the present invention, FIGURE 2 is a general view of the nozzle of FIGURE 1, with portions broken away for clarity, and FIGURE 3 shows diagrammatically the nozzle of FIGURE 1 incorporated into apparatus for generating aerosols.

In carrying the invention into effect according to one convenient mode by way of example, a nozzle, indicated generally as 1, for use in apparatus for generating an aerosol, includes a conduit 2 having a flared end 2a in which is mounted a turbine wheel 3 for rotation about the axis of the conduit 2. The turbine wheel 3 carries turbine blades 4 around its periphery by means of which the wheel 3 may be rotated under the influence of a gas stream passed through the conduit 2 from a suitable blower 5 (FIGURE 3).

The turbine wheel 3 is mounted on a bearing provided by a shaft 6 formed on a central member 7 secured to tubes 8 and 9 which extend diametrically across the conduit 2.

The central member 7 is provided with a bore 10 which communicates with the bore 11 of the tube 9, which in turn communicates with a tube 12 screwed onto the tube 9 outside the conduit 2. The tube 12 is connected by means of a flexible conduit 13 to a reservoir 14 of liquid from which the aerosol is to be generated.

The bore 11 of the tube 9 is provided with a valve rod 15 attached to a knob 16 for controlling the flow of liquid from the bore 11 to the bore 10, the knob 16 being threadedly mounted on a plug 9a formed integrally with the tube 9 so that when knob 16 is rotated the rod 15 is raised to permit an adjustable flow of liquid from bore 11 to bore 10.

The bore 10 of the central member 7 communicates with a transverse bore 17 also formed in the central member 7 both ends of the bore 17 being in communication with an annular cavity 18 formed in the turbine wheel 3.

This cavity 18 receives liquid from the transverse bore 17 and distributes it to six shear tubes 19 arranged on the wheel 3 around its axis in a circular series. At the end of each tube 19 is defined an orifice, all of which orifices lie in the same plane disposed at right angles to the axis of the conduit.

All the orifices are directed rearwardly, that is so as to face into the gas stream from the blower 5, but the orifices are protected from the stream by a forwardly facing shoulder 20 provided on the central member 7. To facilitate the flow of gas around the central member 7, this member 7 is suitably streamlined, as at 21, and a co-axial duct 22 is secured to the transverse tube 8. A clearance of between 10 and 25 thousandths of an inch is left between the plane containing the orifice 5 of the tubes 19 and the facing surface of the shoulder 20.

In operation, the nozzle 1 is connected to a blower 5 by means of a seal 25 and a stream of gas is passed through the conduit 2 causing the turbine wheel to rotate at between 10,000 and 20,000 r.p.m. One end of tube 23 is exposed to the gas stream and the other end is connected, by means of flexible conduit 24, to the liquid reservoir 14 so that pressure is built up in the liquid to facilitate its discharge through conduit 13. The liquid is then fed in the manner previously described to the turbine wheel 3, the liquid emerging from the shear tubes 19 under centrifugal action.

Since the orifices are moving at very high speed through the gas, fine particles are torn off from the film of liquid presented at these orifices, thereby creating an aerosol which is carried away through the conduit by the gas stream flowing past the turbine wheel. Any large particles are thrown onto the shoulder 20, which constitutes an impact plate, and then torn into smaller particles by the gas stream passing the peripheral edge of the shoulder 20.

Since the particles are generated and transported in separate stages, the output of aerosol from the conduit can be varied, without substantially affecting particle size, by varying the velocity of the gas stream through the conduit, provided that the turbine wheel is re-designed to give the same speed of rotation for the different gas stream velocity, and, within certain limits, by varying the size of the annular space between the central member 7 and the duct 22.

Furthermore, the size of the liquid particles in the aerosol can be varied, without substantially affecting the output from the conduit, by varying the design of the turbine blades to cause the turbine wheel to rotate at a different speed for a given gas flow.

Any suitable number of shear tubes may be arranged on the turbine wheel, for example, between two and twelve tubes may be used with advantage.

Various modifications may be made within the scope of the present invention.

I claim:

1. A nozzle for generating an aerosol, which includes means for creating a gas stream, a plurality of tubes arranged in said stream in a circular series around an axis parallel to the direction of flow of the gas stream, the upstream ends of said tubes defining a circular series of supply orifices lying in a plane at right angles to the direction of flow of the gas stream, means shielding the orifices from the gas stream, means for supplying a liquid to the downstream ends of the said tubes so that a liquid surface is presented at each said orifice, and means for rotating said tubes about said axis whereby an aerosol is torn off from the said liquid surface at each orifice, the aerosol being subsequently carried away by said gas stream.

2. A nozzle for generating an aerosol, which includes means for creating a gas stream, a member mounted for rotation about an axis parallel to the direction of flow of the gas stream, a plurality of turbine blades provided on said member whereby the member may be rotated under the influence of the gas stream, a plurality of tubes mounted on the member parallel to its axis, means shielding the upstream ends of the tubes from the gas flow, and means for supplying a liquid to the downstream ends of the said tubes so that a liquid surface is presented at the upstream end of each tube, the arrangement being such that the turbine blades cause the member to rotate at a speed at which an aerosol is torn off from the said liquid surface presented at the upstream end of each tube.

References Cited in the file of this patent

UNITED STATES PATENTS

| | | |
|---|---|---|
| 1,974,538 | Johnston | Sept. 25, 1934 |
| 2,163,474 | Sloan | June 20, 1939 |
| 2,454,339 | Potts et al. | Nov. 23, 1948 |
| 2,585,092 | Conto | Feb. 12, 1952 |
| 2,607,575 | Hession | Aug. 19, 1952 |
| 2,609,233 | Stearman | Sept. 2, 1952 |
| 2,668,698 | Rollins | Feb. 9, 1954 |
| 2,980,338 | Kozinski | Apr. 18, 1961 |
| 3,004,717 | Flury | Oct. 17, 1961 |